F. COOK & B. THOENS.

FEED WATER REGULATOR.

No. 10,957. Reissued Sept. 4, 1888.

Witnesses.
Robt Gwatt.
J. A. Rutherford.

Inventors.
Frederic Cook.
Burchard Thoens.
By James L. Norris.
Atty.

N. PETERS. Photo-Lithographer, Washington, D.C.

UNITED STATES PATENT OFFICE.

FREDERIC COOK AND BURCHARD THOENS, OF NEW ORLEANS, LOUISIANA.

FEED-WATER REGULATOR.

SPECIFICATION forming part of Reissued Letters Patent No. 10,957, dated September 4, 1888.

Original No. 384,510, dated June 12, 1888. Application for reissue filed August 7, 1888. Serial No. 282,475.

*To all whom it may concern:*

Be it known that we, FREDERIC COOK, a citizen of the United States, and BURCHARD THOENS, a subject of the Emperor of Germany, residing at New Orleans, in the parish of Orleans and State of Louisiana, have invented new and useful Improvements in Feed-Water Regulators, of which the following is a specification.

The object of the present invention is to provide an automatic apparatus for regulating the supply of water to a steam-boiler, maintaining a uniform water-level in the boiler, and also to allow the engineer to perform certain operations when necessary for the safety of the boiler, these operations being, first, to change the water-level in the boiler, or, in other words, to carry higher or lower water, as may be desired; second, to pump up the water in the boiler before blowing off; third, to bring the apparatus in condition for use in connection with a fly-wheel pump, or a pump with a dead-center.

To these ends the invention consists in the construction and arrangement of parts, which will be hereinafter more fully described, and then set forth in the claims.

Figure 1:
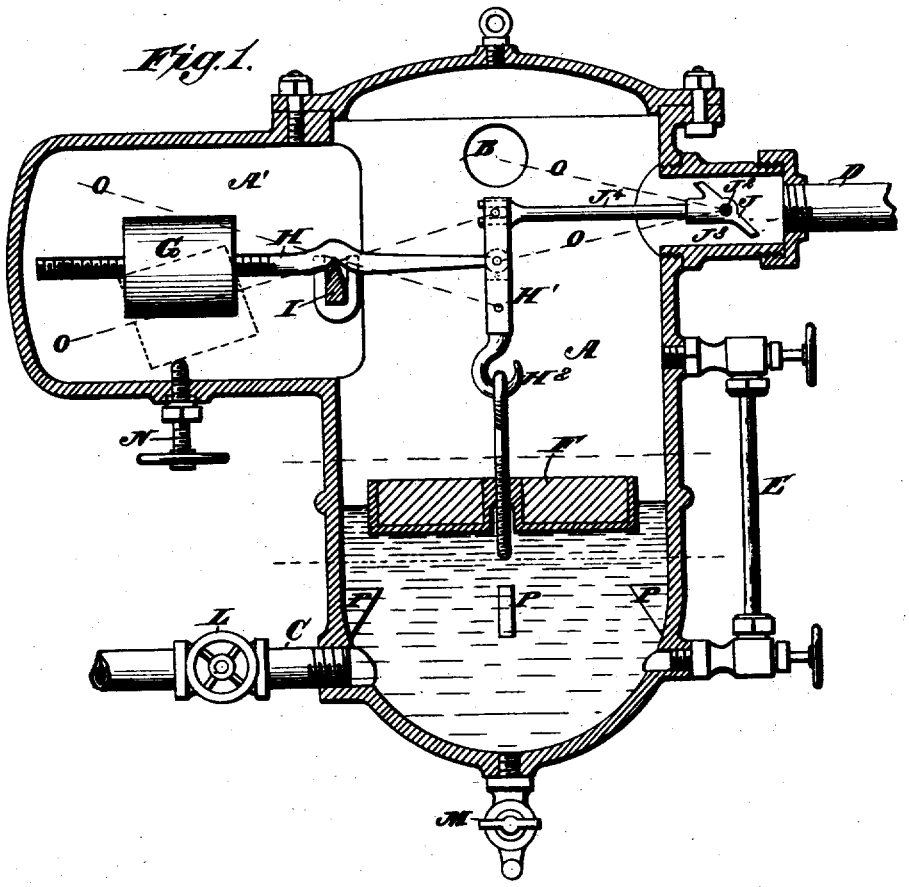
Figure 2:
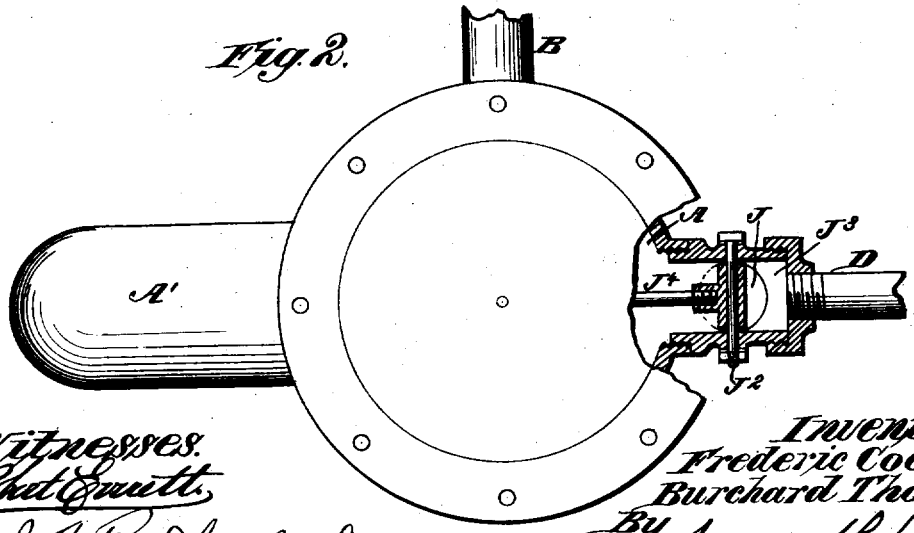

In the accompanying drawings, Figure 1 is a vertical sectional view of a feed-water regulator constructed according to our invention. Fig. 2 is a top view, partly in section.

The reference-letter A designates a closed chamber, which is connected with the steam-space of a steam-boiler by means of the pipe B, so that the chamber will constantly be under the pressure of the boiler. At the bottom of the chamber A is a water-supply pipe, C, which has a valve, L, for opening or closing communication with the chamber. At the top of the chamber A is a pipe, D, which serves to supply steam to a feed-pump (not shown) or apparatus for supplying to the boiler a quantity of water equal to that removed in the form of steam by the blow-off or mud valve or other outlets.

A glass water-gage, E, communicates with the chamber A for indicating the water-level therein, which, it should be observed, is the same as the water-level in the boiler. (Not shown.)

At the top of the main chamber A is formed a lateral compartment, A′, in which is fitted a horizontal lever, H, having its fulcrum on the knife-shaped bar I. One end of this lever carries a fixed head, H′, which has a hook, $H^2$, for the suspension of a weight, F. This weight is partly immersed in the water contained in the chamber A, and it is counterbalanced by a second weight, G, fitted on a screw-threaded portion of the lever H. When the weight F is in its lowermost position and the boiler is empty, it rests upon stops P, formed on the chamber A.

The function of the weight F is to maintain a uniform water-level in the boiler, and as it rises or falls in the chamber A it serves to close or open a balanced regulating-valve, J, which controls the flow of steam through the pipe D to the steam-pump that feeds the water to the boiler.

The valve J may be of any suitable construction. In the present instance it is a disk which turns on a pivot-rod or spindle, $J^2$, fitted into a tubular valve-chamber, $J^3$, screwed to the casing A. The chamber $J^3$ is of a larger diameter than the pipe supplying steam to the steam-pump, for the purpose of supplying enough steam to fill the pipe with a slight opening of the valve and little vertical motion of the immersed weight F.

The valve J carries a rod, $J^4$, which has a forked end fitted on a pin on the end of the lever H, as shown in Fig. 1. The valve J serves to admit steam to the steam feed-pump that supplies the boiler with water, and according to the position of the valve, depending upon the height of water in the chamber A and the position of the float F, the feed-pump will run slower or faster in accordance with the amount of water which is being evaporated in the boiler.

If it is for any reason desirable to carry a higher or lower water-level, it is only necessary to immerse the weight F more or less by moving the counterbalance-weight G on the threaded portion of the lever H. When the weight is moved in an inward direction, the immersed weight F will sink deeper and open the regulating-valve J. Consequently the feed-pump will run faster, and when the weight G is moved in an outward direction, or away from the fulcrum of the lever, the immersed weight will rise and close the regulating-valve to a greater extent, in order to cause the pump to run slower. The same effect can be accomplished by raising or lowering the immersed weight F on the threaded rod K, on which the weight is screwed and by which it is suspended from the hooked end head, $H^2$, of the lever. To illustrate this feature of our feed-water regulator, it is stated, for example, that if it requires twenty strokes of a pump to supply the evaporation in a boiler in a given time, then, by adjusting the immersed weight F higher, and thereby opening the balanced regulating-valve J, the pump will make more than twenty strokes in the same given time. This, then, causes the supply to be in excess of the evaporation, and consequently the water-level will rise to such a point until the position of the regulating-valve will allow the pump to make twenty strokes in the same given time again, but at a higher water-level, whereupon the evaporation and supply of water will be again alike.

A lower water-level in the boiler can be obtained by reversing the operation and lowering the immersed weight F.

When it is desired to "pump up the boiler" before blowing off, the valve L in the water-connection pipe C is closed. The cock M at the bottom of the chamber A is then opened and some water blown out of the regulator-chamber A. This causes the partly-immersed weight F to descend, whereupon the valve J opens, and consequently the feed-pump runs faster and fills up the boiler to the required height before blowing off.

In order to use our regulator with a fly-wheel pump or a feed-pump having a dead-center, we have placed an adjusting-screw, N, under the counter-weight G. This screw can be adjusted until its point touches the counter-weight, which position then determines the slowest speed of the pump at high water. The counter-weight being prevented from falling lower, the immersed weight F cannot rise higher, and the valve J remains open just sufficient to run the pump at its slowest speed at high water without stopping, which it would do if the valve J closed entirely.

Dotted lines O show the position of the lever H and valve-rod $J^4$ at high and low water marks. The weight F may be made of solid metal; but we prefer to make the same of a hollow metal shell, which is filled with stone, or a mixture of sand and cement, or any material heavier than water but lighter than metal.

The object of making the weight F in the described manner is to enable a comparatively small counterbalance-weight G to be used, or, in other words, to reduce the size of the latter weight.

What we claim is—

1. In a feed-water regulator, the combination, with a chamber open to the steam and water of a steam-boiler and internally under its pressure, of a pipe for conveying steam from said chamber to a boiler-feed pump, a partly-immersed weight suspended in the chamber, a counterbalance-weight, a lever carrying said weights, and a balanced valve connected with said lever and located to regulate the supply of steam to the boiler-feed pump, whereby its speed is controlled by the height of the water in the boiler, substantially as described.

2. In a feed-water regulator, the combination, with a chamber open to the steam and water of a steam-boiler and in which the boiler-pressure is maintained, of a pipe for conveying steam from said chamber to a boiler-feed pump, a balanced valve for regulating the supply of steam delivered through said pipe to the boiler-feed pump, a partly-immersed adjustable weight, an adjustable counterbalance-weight, a lever carrying said weights, and a rod connecting said lever with the balanced valve, substantially as described.

3. In a feed-water regulator, the combination of a closed chamber open to the pressure of a steam-boiler, a balanced solid float, a counterbalance-weight, a regulating balanced valve, connecting rod and lever, and adjusting-screw N, substantially as described.

4. In a feed-water regulator, the combination, with the chamber A, float-weight F, counterbalance-weight G, lever H, and rod $J^4$, of the valve-chamber $J^3$, of a larger diameter than the steam-pipe D, and the valve J, arranged within the chamber $J^3$, for the purpose specified, and substantially as described.

5. A feed-water regulator consisting of a tight vessel connected with a steam-boiler above and below its water-line and containing an adjustable partly-immersed weight counterbalanced by an adjustable weight, substantially as described.

6. A feed-water regulator consisting of a tight vessel connected with a steam-boiler above and below its water-line and containing an adjustable partly-immersed weight counterbalanced by an adjustable weight, these weights connected by suitable connections or levers with a balanced regulating-valve leading to the boiler-feeder, substantially as described.

7. A feed-water regulator consisting of a tight vessel connected with a steam-boiler above and below its water-line and containing an adjustable partly-immersed weight counterbalanced by an adjustable weight, these weights connected by suitable connections or levers with a balanced regulating-valve leading to the boiler-feeder, and an adjustable stop to arrest the upward motion of the partly-immersed weight or the downward motion of the counter-weight, substantially as described.

8. A feed-water regulator consisting of a tight vessel connected with a steam-boiler above and below its water-line and containing an adjustable partly-immersed weight counterbalanced by an adjustable weight, these weights connected by suitable connections or levers with a balanced regulating-valve leading to the boiler-feeder, and an adjustable stop to arrest the upward motion of the partly-immersed weight or the downward motion of the counter-weight, a valve in the pipe which connects the regulator-vessel with the boiler below its water-line, and a blow-off valve in the regulator-vessel, substantially as described, and for the purpose set forth.

In testimony whereof we have hereunto affixed our signatures in the presence of two subscribing witnesses.

FREDERIC COOK.
BURCHARD THOENS.

Witnesses:
J. Y. B. HASKELL,
L. E. HOOPER.